United States Patent [19]
Alesi

[11] 3,779,687
[45] Dec. 18, 1973

[54] APPARATUS OF VACUUM FORMING

[75] Inventor: John A. Alesi, Santa Monica, Calif.

[73] Assignee: Formex Manufacturing Inc., Santa Monica, Calif.

[22] Filed: May 14, 1970

[21] Appl. No.: 48,722

Related U.S. Application Data

[62] Division of Ser. No. 558,641, June 20, 1966, abandoned.

[52] U.S. Cl. .............. 425/383, 425/384, 425/388, 425/404
[51] Int. Cl. ............................................ B29c 17/00
[58] Field of Search .................. 425/340, 341, 342, 425/388, 346, 383, 384, 404; 264/90, 92

[56] References Cited
UNITED STATES PATENTS

| | | | |
|---|---|---|---|
| 3,256,565 | 6/1966 | Alesi et al. | 425/388 X |
| 2,081,777 | 5/1937 | Talalay | 264/90 |
| 2,513,052 | 6/1950 | Roberts | 425/346 X |
| 3,172,927 | 3/1965 | Majonnier | 425/388 X |
| 1,157,420 | 10/1915 | Roberts | 425/342 X |
| 3,099,043 | 7/1963 | Held | 425/388 X |
| 3,263,008 | 7/1966 | Bender | 425/388 X |
| 3,172,159 | 3/1965 | Edwards | 425/346 |

*Primary Examiner*—J. Howard Flint, Jr.
*Attorney*—Fulwider, Patton, Rieber, Lee & Utecht

[57] ABSTRACT

Apparatus for forming first and second sheets of heat-fusible plastic into a hollow structure when the sheets are heated to an initial temperature and mechanically prestretched into the cavities of first and second mold members. Vacuum is then applied between each of the sheets and such mold cavities to draw the sheets into their formed configuration. The sheets are then reheated to a higher temperature and the mold members urged together to effect fusing engagement of the sheets.

4 Claims, 11 Drawing Figures

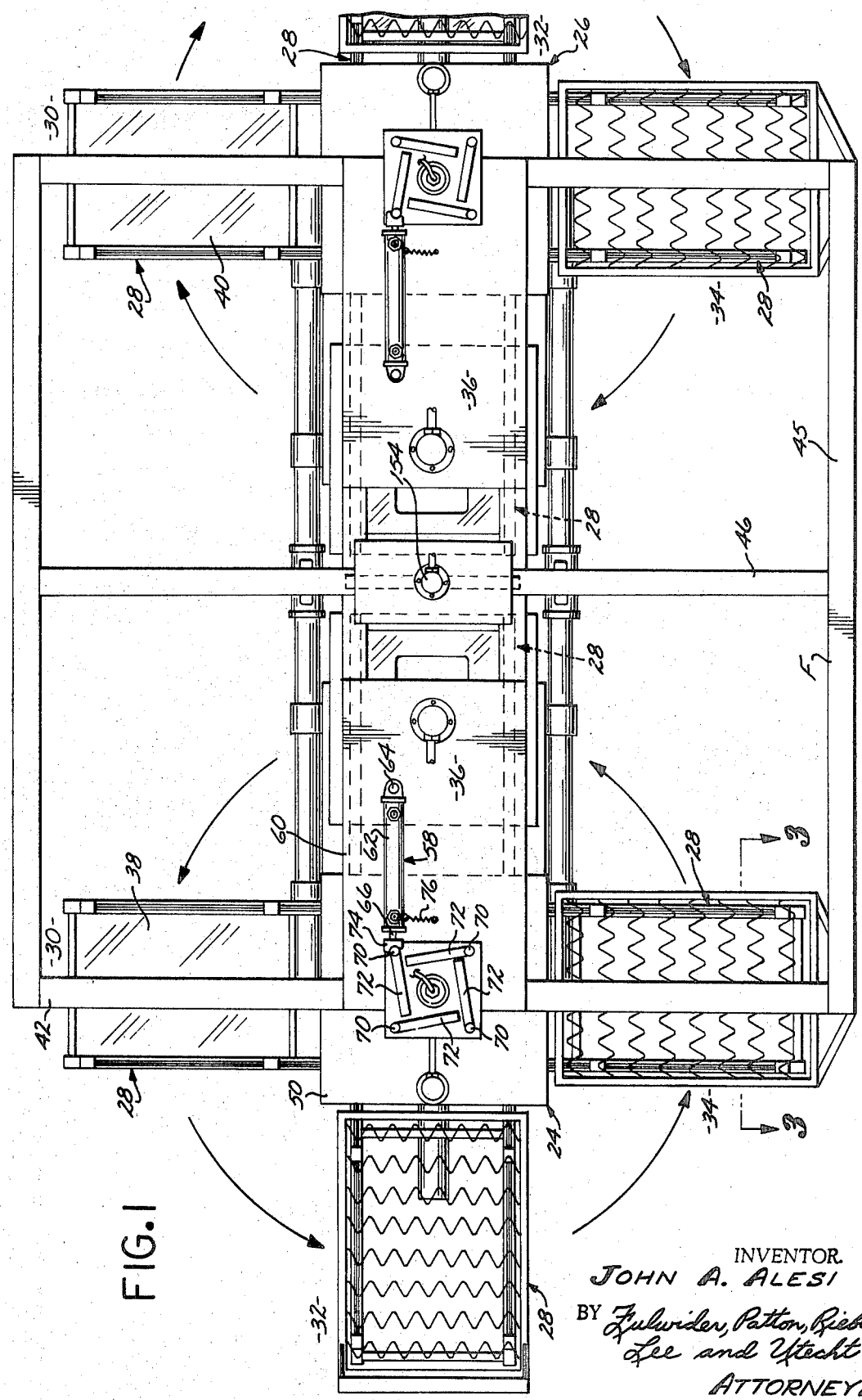

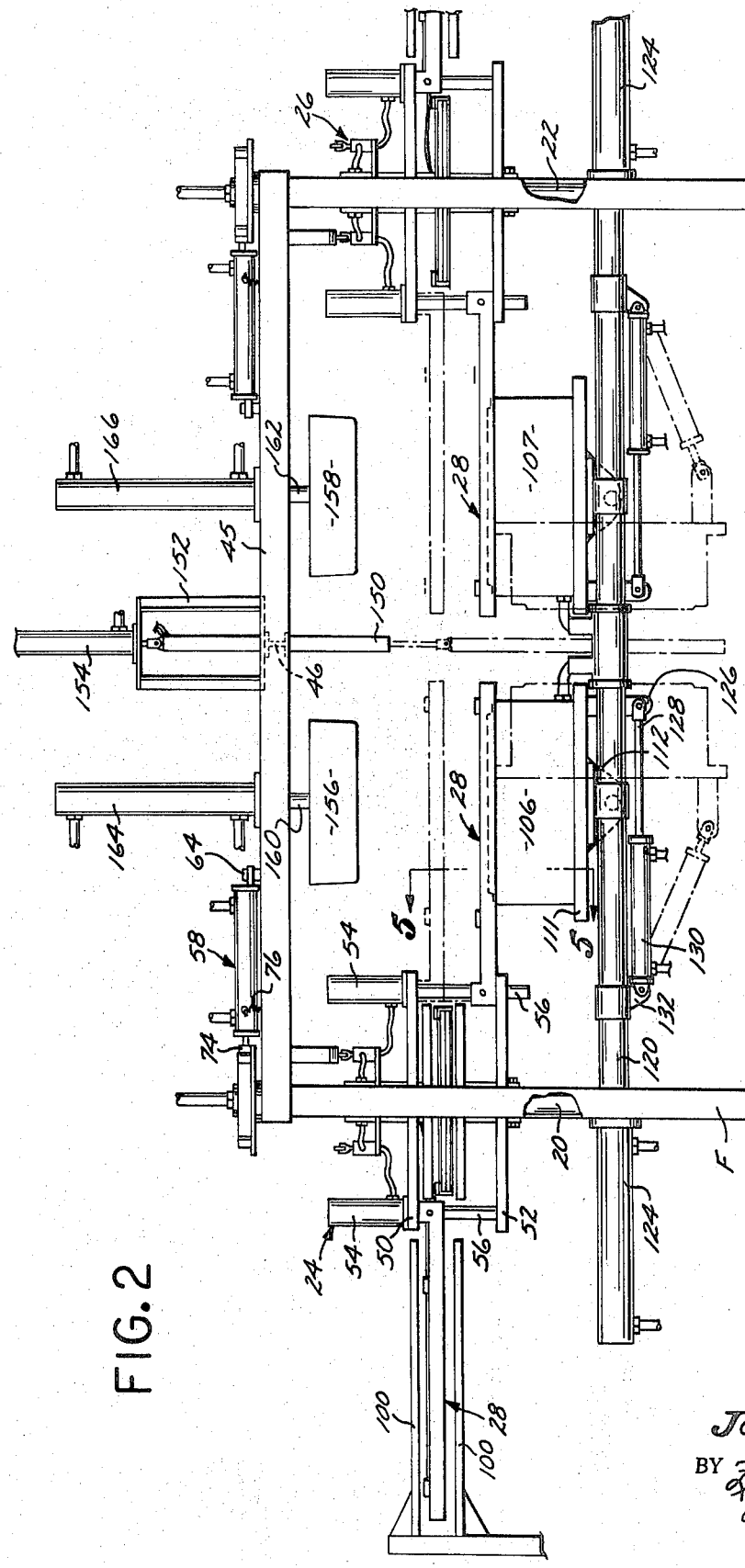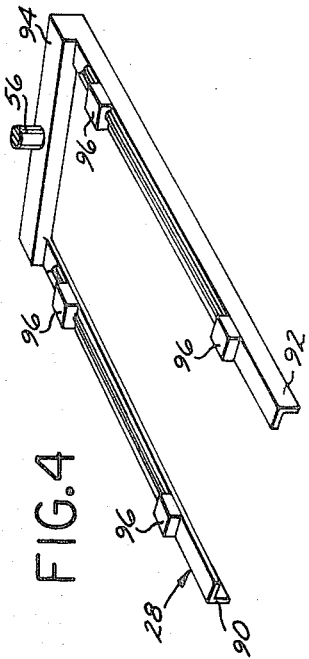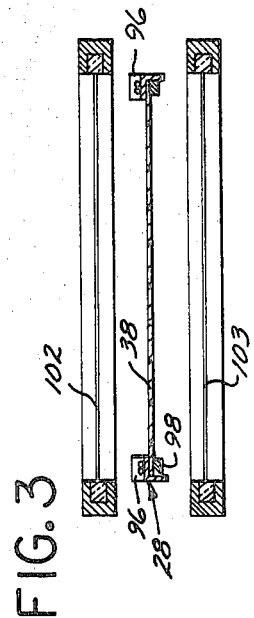

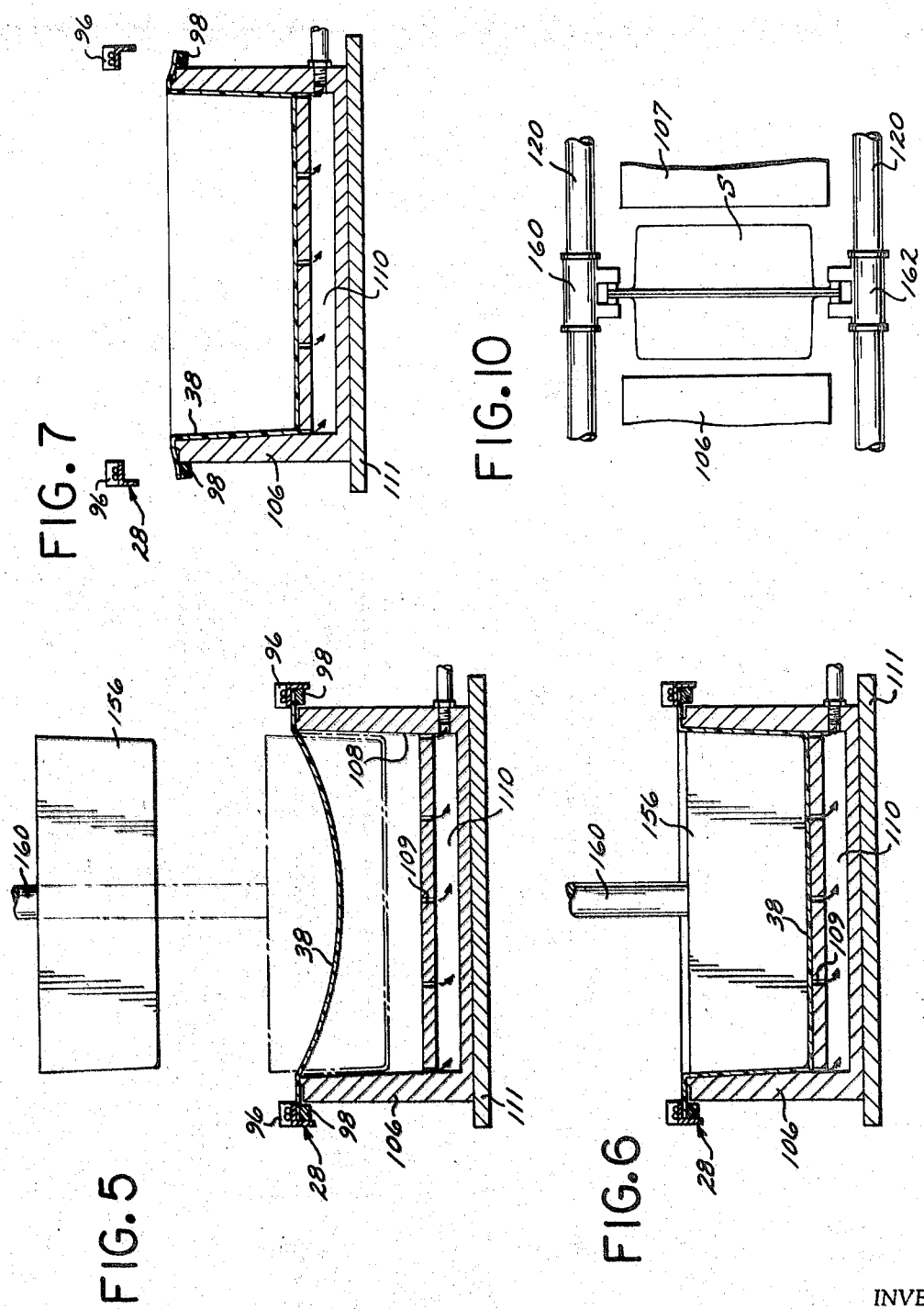

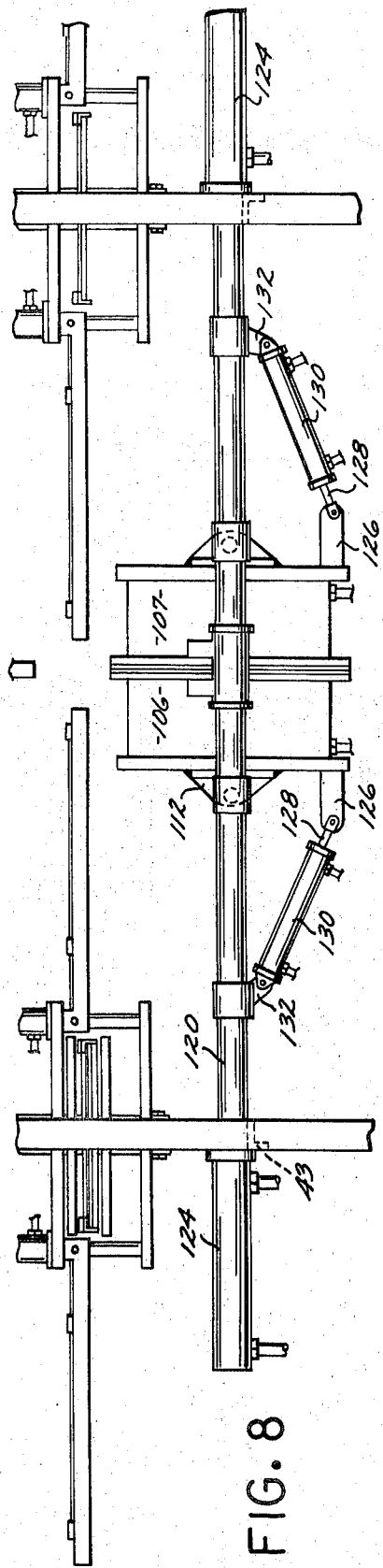
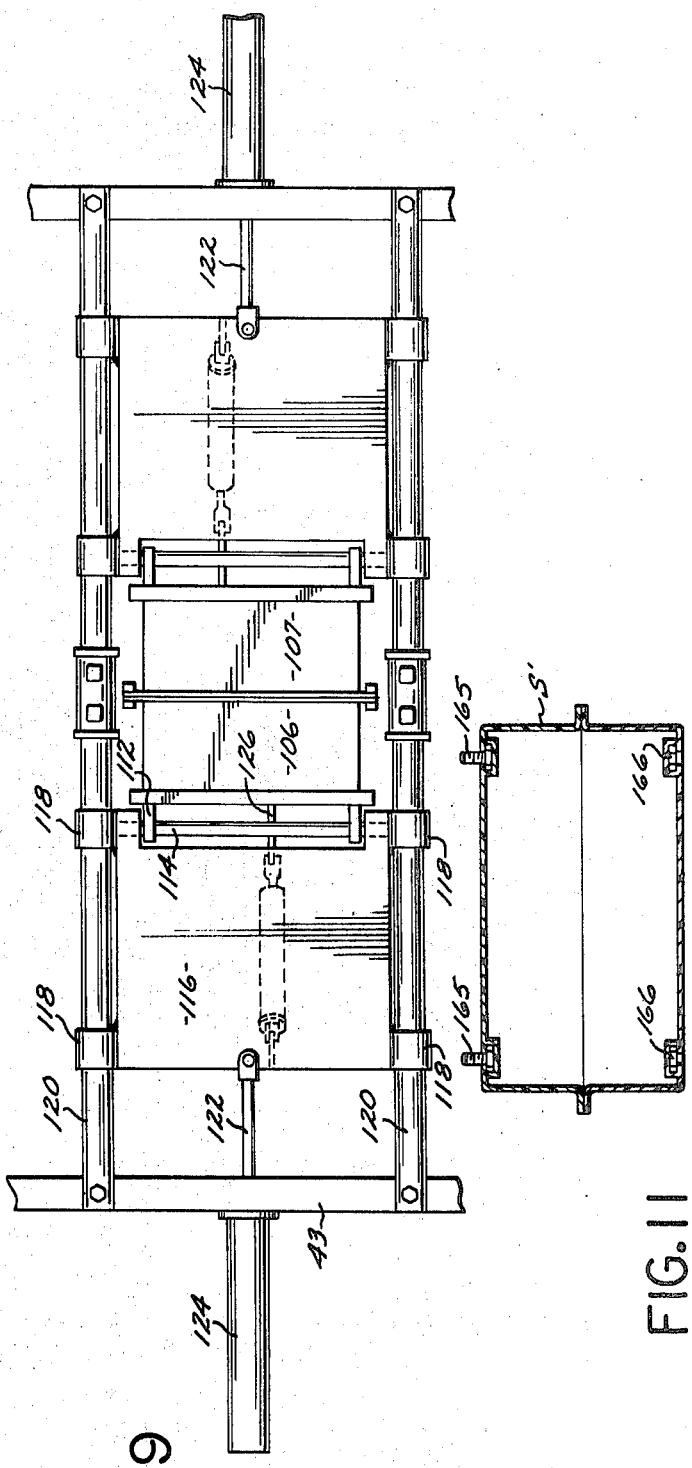
FIG. 8 FIG. 9 FIG. 11
INVENTOR.
JOHN A. ALESI

APPARATUS OF VACUUM FORMING

This is a division of application Ser. No. 558,641 filed June 20, 1966 and now abandoned.

The present invention relates generally to the art of molding and more particularly to a novel apparatus for forming thermoplastic sheets into a hollow structure.

It is a major object of the present invention to provide an apparatus for forming two sheets of heat-fusible synthetic plastic into a hollow structure, such sheets being interconnected by fusing along their adjoining edges.

It is another object of the present invention to provide an apparatus of the aforedescribed nature by means of which hollow structures having a deep form may be readily fabricated.

It is yet another object of the present invention to provide apparatus for forming two sheets of heat-fusible synthetic plastic into a hollow structure having walls of substantially uniform thickness.

A further object of the present invention is to provide apparatus of the aforedescribed nature wherein inserts may be readily molded into both the upper and the lower parts of the completed structure.

A more particular object of the present invention is to provide apparatus of the aforedescribed nature utilizing first and second frame means that support the edges of first and second heat-fusible synthetic plastic sheets, such frame means being movable between plastic sheet heating means and first and second horizontally-separated mold halves, with such mold halves having complementary edges inwardly of which are defined mold cavities that cooperate to define the shape of the hollow structure. A vacuum is applied between the heated sheets and their respective mold cavities to draw the sheets into the confines of the mold cavities, such mold halves then being pivoted until their mold cavities face one another. Thereafter, such mold halves are urged together horizontally to cause the heated sheets to be engaged under pressure along the periphery of the hollow structure to thereby fuse the sheets together in a seam along such periphery.

It is another particular object of the present invention to provide apparatus of the immediately aforedescribed nature wherein secondary heating means are interposed between the two mold halves to apply a fusing heat to the plastic sheets as said mold cavities face one another.

It is another particular object of the present invention to provide apparatus of the aforedescribed nature wherein means are provided for prestretching the heated plastic sheets before the latter are vacuum drawn into the confines of the mold cavities.

These and other objects and advantages of the present invention will become clear from the following detailed description, when taken in conjunction with the appended drawings, wherein:

FIG. 1 is a broken top plan view of a preferred form of apparatus embodying the present invention;

FIG. 2 is a broken side elevational view of said apparatus;

FIG. 3 is a vertical sectional view taken in enlarged scale on line 3—3 of FIG. 1;

FIG. 4 is a perspective view of a sheet support member of said apparatus;

FIG. 5 is a vertical sectional view taken on line 5—5 of FIG. 2 and showing a first step in the use of the apparatus of the present invention;

FIG. 6 is a view similar to FIG. 5, but showing a second step in said use;

FIG. 7 is a view similar to FIGS. 5 and 6, but showing a third step in said use;

FIG. 8 is a broken side elevational view showing a fourth step in said use;

FIG. 9 is a broken top plan view corresponding to FIG. 8;

FIG. 10 is a broken top plan view showing a structure formed in accordance with the present invention; and FIG. 11 is a vertical sectional view showing a second type of structure formed in accordance with the present invention.

Referring to the drawings, a preferred form of apparatus embodying the present invention is of the rotary type, i.e., it utilizes a plurality of working stations. The apparatus includes a fixed frame F provided with a pair of like left and right vertical spindles 20 and 22. Each vertical spindle is keyed to a left and right transfer frame, generally designated 24 and 26, respectively. The transfer frames 24 and 26 are of like construction and each carries four pair of plastic sheet support members generally designated 28. As indicated particularly in FIG. 1, each transfer frame successively rotates the sheet support members 28 between a loading station 30, a preheating station 32, a heating station 34, and a molding station 36. The sheet support members of transfer frame 24 removably receive flat, heat-fusible synthetic plastic sheets 38 while the sheet support members of transfer frame 26 removably receive similar sheets designated 40.

More particularly, the fixed frame F includes four vertical corner posts 41, the upper ends of which are bridged by crossbeams 42. Crossbeams 43 extend between the intermediate portions of the corner posts. The aforementioned spindles 20 and 22 are supported at the centerline of the crossbeams 42. Horizontal beams 45 extend between the upper ends of the corner posts 41, and the midportion of such beams are connected by a crossbeam 46. Transfer frame 24 includes upper and lower plates 50 and 52 which are rigidly maintained in vertically-spaced relationship on the spindles 20 and 22. The upper plate 50 supports the lower end of four vertically-extending, fluid-actuated cylinders 54, through the bottom end of which extends a retractable plunger 56. The lower portion of such plungers 56 are guided by complementary bores (not shown) formed in the lower plate 52. The plungers 56 rigidly support the inner ends of the aforementioned sheet support members 28 whereby vertical movement of the latter may be effected by vertical movement of the plungers 56.

Transfer frame 24 is rotated through 90° increments by means of a horizontally-extending double-acting ram 58 that is supported on a horizontal plate 60 that is rigidly carried by the left-hand crossbeam 43 as viewed in FIGS. 1 and 2. The inner end of the cylinder 62 of ram 58 is pivotally affixed to the plate 60 by means of a vertical pivot pin 64. The piston rod 66 of the ram 58 is extendable towards and away from a horizontal indexing plate 68 that is keyed to the upper end of the spindle 20. Each corner of the indexing plate 68 is formed with an upstanding push-pin 70 of like construction. A retractor bar 72 extends away from each pin 70 towards the opposite edge of the indexing plate 68 at an angle towards the center of such plate. Each push-pin 70 is consecutively engageable with the notched end of a pusher element 74 that is fixed to the free end of the piston rod 66. Thus, extension of the piston rod 66 from its position of FIGS. 1 and 2 will cause the indexing plate 68 and hence the transfer frame 24 to undergo counterclockwise rotation through an arc of 90°. As the piston rod 66 is thereafter retracted, the pusher element 74 will be caused to move outwardly from the spindle 20 by engagement with the retractor bar 72. Provision for this outward movement of the pusher element 68 is afforded because of the pivotal mounting of the indexing ram 58 relative to the plate 60. Tension spring 76 serves to return the indexing ram 58 to its normal position. Referring to the right-hand portion of FIG. 1, it will be apparent that transfer frame 26 is provided with similar means for effecting its rotation through 90° increments, but in a clockwise direction rather than a counterclockwise direction.

Referring now particularly to FIG. 4, each of the aforementioned sheet support members 28 includes a pair of generally L-shaped arms 90 and 92 which are rigidly interconnected at their inner ends by means of a crossarm 94, the aforementioned plungers 56 being rigidly affixed to the midportion of crossarm 94. One or more electromagnets 96 are positioned upon the upper surface of each of the arms 90 and 92. Referring additionally to FIG. 3, the plastic sheets 38 or 40 are adapted to be temporarily supported between the arms 90 and 92 by means of a pair of steel support strips 98 disposed below the edges of the sheets. The strips are held against the underside of the upper surfaces of the arms 90 and 92 by means of the electromagnets 96.

The preheating stations 32 and the heating stations 34 are generally similar. The preheating stations 32 include a pair of vertically aligned upper and lower horizontal heating elements 100 and 101, while heating stations 34 include similar elements 102 and 103. These heating elements 100, 101, 102 and 103 may be of the conventional electrical resistance type. The left-hand and the right-hand preheating and heating stations are of like construction.

The left-hand and right-hand molding stations 36 are likewise of similar construction. Each such molding station includes a like mold, generally designated 106 and 107. As shown particularly in FIG. 5, each mold is formed with a mold cavity 108 from which extend vacuum passages 109 to a vacuum chamber 110 connected with a source of vacuum (not shown) in a conventional manner. The base of the molds rests upon a horizontal platen 111. The side portions of the underside of the platen 111 are formed with a pair of depending brackets 112. The brackets 112 are pivotally interconnected to a horizontal rod 114 that is carried at the front of a horizontal slider plate 116. As indicated particularly in FIG. 9, the slider plate 116 is formed at its corners with sleeves 118 which are slidably carried by a pair of horizontal tubes 120 which rigidly extend between the intermediate crossbeams 43. With continued reference to FIG. 9, the outer portion of each slider plate 116 is connected to the plunger 122 of a fluid-actuated cylinder 124. The cylinder 124 is rigidly affixed to the midportion of the intermediate crossbeam 43.

As shown particularly in FIGS. 2, 8 and 9, the inner underside of the platen 110 is provided with a depending lug 126. The lower end of the lug 126 is pivotally connected to the plunger 128 of a fluid-actuated cylinder 130. The outer end of the cylinder 130 is pivotally connected to a lug 132 that depends from the outer edge of the slider plate 116. It will be apparent that the fluid-actuated cylinder 124 effects movement of the mold halves 106 and 107 towards and away from one another in a horizontal plane, while the fluid-actuated cylinder 130 effects tilting movement of the mold halves 106 and 107 from an initial horizontally-aligned position shown in solid outline in FIG. 2 to a vertically-extending position wherein the mold cavities 108 face one another, as shown in phantom outline in this figure.

As shown particularly in FIG. 2, an auxiliary heating means 150 is supported by a subframe 152 at the center of the frame F on center crossbeam 46. The auxiliary heating means 150 may be of the electrical resistance type and is movable from its raised solid outline position of FIG. 2 to its lowered phantom outline position of this figure by means of a double-acting, fluid-actuated cylinder 154 supported by subframe 152.

Disposed above the mold 106 is a plug 156 having a configuration complementary to mold cavity 108, while a like plug 158 is disposed above mold 107. Plug 156 is affixed to the lower end of a plunger 160 and plug 107 is affixed to the lower end of a second plunger 162. The plungers are raised and lowered relative to the mold 106 and 106 by means of vertically-extending, fluid-actuated cylinders 164 and 166, respectively.

Suitable valving (not shown) is provided for each of the aforementioned fluid-actuated cylinders in accordance with conventional practice in a manner well known to those skilled in the art.

In the operation of the aforedescribed apparatus, the plastic sheets 38 and 40 will be loaded upon the sheet support members 38 at the left-hand and right-hand loading stations 30. This is accomplished by inserting the sheets between the arms 90 and 92 with the two support strips 98 arranged below the side edges of the sheets. Electric current is directed to the electromagnets 96 so as to attract the support strips 98 upwardly toward said electromagnets to thereby rigidly clamp the plastic sheets in place. It should be noted that during the loading operation the sheet support members 28 are normally disposed in a raised position by means of their respective fluid-actuated cylinders 54.

Next, the loaded sheet support members 28 are rotated 90° to the left-hand and right-hand preheating stations 32. As indicated in FIG. 2, the sheet support members 28 remain in their raised position at this station. At the preheating stations 32 the upper and lower surfaces of the plastic sheets 38 and 40 are heated by means of the upper and lower heating elements 100 and 101 to a temperature less than that at which the molding of the sheets is to take place. The preheated sheets are then rotated through another 90 degree increment to the left-hand and right-hand heating stations 34. At this time, the sheet support members 28 will remain in their raised position. At the heating stations 34, the upper and lower surfaces of the plastic sheets are heated to a temperature at which the molding operation may take place by heating elements 102 and 103.

The heated plastic sheets are then rotated through another 90° increment to dispose them at the left-hand and right-hand molding stations 36. At the molding stations, the fluid-actuated cylinders 54 are operated to lower the sheet support members 38 from their phantom outline position of FIG. 2 to their solid outline position therein. In such lowered position, the heated plastic sheets will engage the edges of the mold cavities 108.

If the object being molded requires a deep mold cavity, the plugs 156 and 157 (or either one of them, depending upon the configuration of the two mold halves) will be lowered so as to engage the heated plastic sheet therebelow and force such sheet into the confines of the mold cavities 108, as indicated in dotted outline in FIG. 5. The utilization of the plugs 156 and 157 will prestretch the plastic sheets 38 and 40 so as to obtain a uniform wall thickness with no thin wall areas. A vacuum is applied to the underside of the mold cavities 108 through vacuum chamber 110 and vacuum passages 109. Plugs 156 and 158 may then be raised by means of their respective fluid-actuated cylinders 164 and 166. The vacuum serves to draw the heated plastic sheets into the final desired configuration provided by the mold cavities 108, as indicated in FIG. 6.

It should be particularly noted that because both sides of the plastic sheets 38 and 40 were simultaneously heated, such sheets will have maximum pliability as they are urged into the mold cavities. It should be further noted that the provision of two separate heating means for the two plastic sheets permits the sheets to be heated to different temperatures, and also permits the upper and lower surfaces of the sheets to be heated at different temperatures where this is desirable.

After the vacuum-forming operation has been completed, electric current will be cut off from the electromagnets 96 of the sheet support members 38. The sheet support elements 28 may then be raised by means of their respective fluid-actuated cylinders 54 leaving the formed plastic sheets within their respective mold cavities 108, as indicated in FIG. 7.

Next, the left and right-hand fluid-actuated cylinders 130 will be actuated so as to retract their respective plungers 128 and thereby pivot the mold halves 106 and 107 into a vertical position wherein their mold cavities 108 face one another, i.e., from the solid outline position of mold halves 106 and 107 in FIG. 2 to the phantom outline position of these elements shown in this figure. Such pivoting of the mold halves is permitted by the aforementioned raising of the sheet support members 28 to their upper portion. If desired, vacuum may still be applied to the underside of the mold cavities during this step.

At this time, it may be desirable to apply additional heat to the edges of the plastic sheets 38 and 40 by means of the auxiliary heating means 150. Assuming the auxiliary heating means 150 is utilized, it is lowered into a heating position between the two vertically-extending mold halves 106 and 107 by means of its fluid-actuated cylinder 154, as indicated in phantom outline in FIG. 2. Thereafter, the cylinder 154 will raise the auxiliary heating means 150 to its solid outline position of FIG. 2.

Next, the left-hand and right-hand fluid-operated cylinders 124 will be actuated to urge the slider plates 116 and hence the two vertically-extending mold halves 106 and 107 together until the edge portions of the plastic sheets 38 and 40 are engaged under pressure along the edges of the mold cavities 108 whereby the sheets are fused together in a seam along the periphery of the hollow structure S defined by the sheets. This is the condition shown in FIGS. 8 and 9. After the sheet edges have cooled sufficiently to obtain the necessary hardness, the fluid-operated cylinders 124 serve to retract the two mold halves 106 and 107 horizontally away from one another, as indicated in FIG. 10. Preferably, the structure S defined by the now formed and fused-together sheets will be retained at the midportion of the frame F by means of a pair of forked retainers 160 and 162 pivotally carried by the midportion of the two tubes 120, such retainers being rotated into wedging engagement with the edges of the structures, as indicated particularly in FIG. 10. Although only the edges of sheets 38 and 40 are shown as being fused together, it will be apparent that intermediate predetermined portions of the sheets may also be fused together depending upon the configuration of the structure being formed.

It is important to note that the aforedescribed auxiliary heating means 150 is especially effective where forming comparatively large structures from comparatively thin plastic sheets. If it is attempted to heat such thin plastic sheets to a temperature high enough that the fusing operation may take place solely at the preheating and heating stations, such highly-heated sheets may undergo considerable sagging thereby making more difficult the forming operation. By use of the aforedescribed method, it is not necessary to apply extreme heat to the sheets before the forming operation, and instead, such sheets need be heated only to the temperature required for forming, the heat of fusing being applied to the already-formed sheets by means of the auxiliary heating means 150 immediately prior to the fusing step. The use of the auxiliary heating means 150 is also desirable where the plastic sheets being formed are relatively thick and/or have a relatively high specific heat, since the use of such auxiliary heating means eliminates the necessity of heating such plastic sheets at the preheating and heating stations to a temperature high enough to permit fusing. If this type of sheet is heated to such comparatively high temperatures, considerable cooling time would be required after the fusing operation. By use of the auxiliary heating means, however, it is only necessary to reheat the edges of the plastic sheets which are to be fused just prior to engagement of the two sheets.

The aforedescribed apparatus is particularly useful where it is desired to incorporate inserts in both halves of the completed structure S. Such inserts are useful, for example, in providing increased mechanical strength at critical areas of the hollow structures or for incorporating fastening means substantially stronger than can be afforded by the plastic material itself. Such inserts may be readily incorporated in both of the plastic sheets 38 and 40 being formed since the mold cavities 108 of both mold halves 106 and 107 face downwardly. Referring now to FIG. 11, there is shown a typical hollow formed structure S' incorporating such inserts 165 and 166 in the upper and lower surface of said structure.

It should be noted that while there has been shown and described herein a plug assist type of preforming of the heated plastic sheets 38 and 40, other means for preforming or prestretching the heated plastic sheets prior to the application of vacuum within the mold cavities 108 may be substituted for such plug assist means. It should also be noted that the plastic sheets 38 and 40 may be temporarily supported below the arms 90 and 92 of the sheet support members 28 by simple mechanical clamps rather than the electromagnetic type arrangement disclosed herein.

Various other modifications and changes may be made with respect to the foregoing detailed description without departing from the spirit of the present invention or the scope of the following claims:

I claim:

1. Apparatus for forming first and second sheets of heat-fusible plastic into a hollow structure, comprising:
a frame;
first and second support members that releasably support the edges of said sheets;
heating means for said sheets;
first and second mold members, each having complementary edges and formed inwardly of said edges with mold cavities that cooperate to define the shape of said hollow structure, said mold members being movably mounted on said frame for movement between a horizontally-extending spaced-apart position to a vertically-extending facing position;
power-operated means on said frame for moving said mold members between said positions;
means for applying a vacuum between said sheets and their respective mold cavities to draw said sheets into said mold cavities;
transfer means on said frame carrying said support members for first moving said sheets between said heating means and thereafter into a position over said mold members;
second power-operated means on said frame for urging said mold members together while said mold members are disposed in said vertically-extending facing position to thereby cause said edges to apply mechanical pressure to the portions of said sheets adjacent said edges whereby said sheet portions are fused together;
auxiliary heating means; and
means on said frame for moving said auxiliary heating means into the space between said mold members when the latter are disposed in their vertically-extending facing position to thereby apply fusing heat to said plastic sheets, with said last-mentioned means moving said auxiliary heating means out of said space before said mold members are urged together.

2. Apparatus as set forth in claim 1 wherein said heating means include upper and lower vertically-spaced heating elements, with said sheets being disposed therebetween for heating.

3. Apparatus as set forth in claim 1 and further comprising means for mechanically prestretching each of said sheets, said prestretching means including a plug having a profile complementary to its respective mold cavity.

4. Apparatus as set forth in claim 2 and further comprising means for mechanically prestretching each of said sheets, said prestretching means including a plug having a profile complementary to its respective mold cavity.

* * * * *